United States Patent
Chen

(10) Patent No.: US 9,776,454 B2
(45) Date of Patent: Oct. 3, 2017

(54) CONNECTION STRUCTURE BETWEEN AIRLESS TIRE AND RIM AND FASTENING MEMBERS THEREOF

(71) Applicant: OTRAJET INC., Taichung (TW)

(72) Inventor: Ching-Hao Chen, Taichung (TW)

(73) Assignee: OTRAJET INC., Taichung (TW)

( * ) Notice: Subject to any disclaimer, the term of this patent is extended or adjusted under 35 U.S.C. 154(b) by 67 days.

(21) Appl. No.: 14/596,467

(22) Filed: Jan. 14, 2015

(65) Prior Publication Data

US 2015/0224825 A1    Aug. 13, 2015

(30) Foreign Application Priority Data

Feb. 10, 2014    (TW) .............................. 103202311 U

(51) Int. Cl.
*B60C 7/24*    (2006.01)
*F16B 21/08*    (2006.01)

(52) U.S. Cl.
CPC .............. *B60C 7/24* (2013.01); *F16B 21/084* (2013.01)

(58) Field of Classification Search
CPC . B60C 7/00; B60C 7/24; F16B 21/084; F16B 21/084; F16B 21/086
USPC ....... 152/246, 311, 378, 379.3, 379.4, 379.5, 152/382, 386, 387, 388, 393; 411/510
See application file for complete search history.

(56) References Cited

U.S. PATENT DOCUMENTS

| | | | |
|---|---|---|---|
| 7,159,632 B2 * | 1/2007 | Fukui ........................ | B60C 7/26 152/246 |
| 2006/0096685 A1 * | 5/2006 | Fukui ........................ | B60C 7/26 152/387 |
| 2007/0134073 A1 * | 6/2007 | Shereyk ................ | F16B 21/084 411/510 |
| 2007/0147975 A1 * | 6/2007 | Homner ................ | F16B 5/0642 411/510 |
| 2012/0111468 A1 | 5/2012 | Lee | |
| 2014/0041164 A1 * | 2/2014 | Huelke ............... | B60R 13/0206 24/458 |

FOREIGN PATENT DOCUMENTS

| | | |
|---|---|---|
| CN | 201080001376.4 | 4/2011 |
| EP | 2457747 A1 | 5/2012 |
| JP | P20111-527974 A | 11/2011 |
| WO | WO2011010785 A1 | 1/2011 |

* cited by examiner

*Primary Examiner* — S. Joseph Morano
*Assistant Examiner* — Jean Charleston
(74) *Attorney, Agent, or Firm* — Guice Patents PLLC

(57) ABSTRACT

A connection structure between airless tire and rim and fastening members thereof. The connection structure includes: a rim having an annular rim body and an annular connection groove formed on outer circumference of the rim body; an airless tire having an annular tire body coaxially fitted on the rim body, multiple sockets radially extending from inner circumference of the tire body into the tire body; and multiple fastening members. Each of the fastening members has an extension section with a predetermined length. The extension section is coaxially inserted in the corresponding socket with one end protruding from an opening of the socket on the inner circumference of the tire body. The fastening member further has a base section fixedly connected with one end of the extension section. The base section is engaged in the connection groove. The fastening members serve to securely connect the airless tire with the rim.

4 Claims, 7 Drawing Sheets

CONNECTION STRUCTURE BETWEEN AIRLESS TIRE AND RIM AND FASTENING MEMBERS THEREOF

The current application claims a foreign priority to the patent application of Taiwan No. 103202311 filed on Feb. 10, 2014.

BACKGROUND OF THE INVENTION

Field of the Invention

The present invention relates generally to an airless tire, and more particularly to a connection structure between airless tire and rim and fastening members thereof.

Description of the Related Art

Chinese Patent No. 201080001376.4 discloses a technique for connecting airless tire with the rim. In this technique, multiple strip-shaped stopper members are inserted in a tire lip section of the airless tire and inlaid in the groove of the rim. Two ends of the stopper members are engaged with inner side of the opening of the groove of the rim. Accordingly, the stopper members are engaged with the rim to locate the tire lip in the groove of the rim so as to connect the airless tire with the rim.

In the conventional inflatable tire structure, the structure layers of fiber wires, steel string rings, artificial fiber strings and tire lip steel wires are used to provide sufficient strength for the tire. When the tire contacts the ground to bear a load and rotate, the tire can keep a complete configuration so as to ensure that the tire is stably connected with the rim and ensure the safety in driving. With respect to an airless tire, especially a solid tire or cavity airless tire, the structure of such tire generally has no structure layer as the inflatable tire. The airless tire only has an elastic antiwear structure similar to the rubber layer of the inflatable tire for providing elasticity and shock absorption effect. Therefore, when the airless tire runs on the ground, in comparison with the inflatable tire, the ability of the airless tire to keep the configuration unchanged is obviously weaker. Therefore, when the airless tire 1 contacts the ground to run over an obstacle 2 as shown in FIG. 1, in the case that the force applied to the airless tire 1 is greater than the engagement force between the stopper members 3 and the groove 4, the tire lip will detach from the rim. This will affect the safety and needs to be overcome.

SUMMARY OF THE INVENTION

It is therefore a primary object of the present invention to provide a connection structure between airless tire and rim and fastening members thereof. The fastening members serve to securely connect the airless tire with the rim. Also, the fastening members serve to provide suitable locating and support effect for the airless tire to enhance the strength thereof. When the airless tire contacts the ground to run over an obstacle, the airless air is prevented from detaching from the rim so as to ensure safety in driving.

To achieve the above and other objects, the connection structure between airless tire and rim of the present invention includes: a rim having an annular rim body and an annular connection groove formed on outer circumference of the rim body; an airless tire having an annular tire body coaxially fitted on the rim body, multiple sockets radially extending from inner circumference of the tire body into the tire body; and multiple fastening members. Each of the fastening members has an extension section with a predetermined length. The extension section is coaxially inserted in the corresponding socket with one end protruding from an opening of the socket on the inner circumference of the tire body. The fastening member further has a base section fixedly connected with one end of the extension section. The base section is engaged in the connection groove.

In the above connection structure between airless tire and rim, the extension section has a column body tightly inserted in the socket so that the fastening member is securely connected with the airless tire.

In the above connection structure between airless tire and rim, the extension section further includes at least one protrusion outward radially protruding from the column body to engage with wall of the socket so as to enhance the connection strength between the fastening member and the airless tire.

In the above connection structure between airless tire and rim, the extension section further has a split inward axially extending from a free end of the column body to divide the column body. Accordingly, under an external force, the column body will be temporarily contracted to reduce the outer diameter. In this case, the column body can be successfully inserted into the corresponding socket with smaller inner diameter. After the external force disappears, the column body can restore to its original state with larger outer diameter and expand within the socket. Accordingly, the column body can apply a force to the wall of the socket to enhance the connection strength between the fastening member and the airless tire.

In the above connection structure between airless tire and rim, the inner circumference of the tire body is formed with a receiving section in which the fastening member is inlaid to engage the fastening member with the rim. To speak more specifically, the tire body has an annular main body, an annular tire lip protrudes from the inner circumference of the main body. The tire lip is inserted in the connection groove. Multiple recesses are formed on the inner circumference of the tire lip. The base sections are inlaid in the corresponding recesses.

The present invention can be best understood through the following description and accompanying drawings, wherein:

DETAILED DESCRIPTION OF THE PREFERRED EMBODIMENTS

Figure 1:
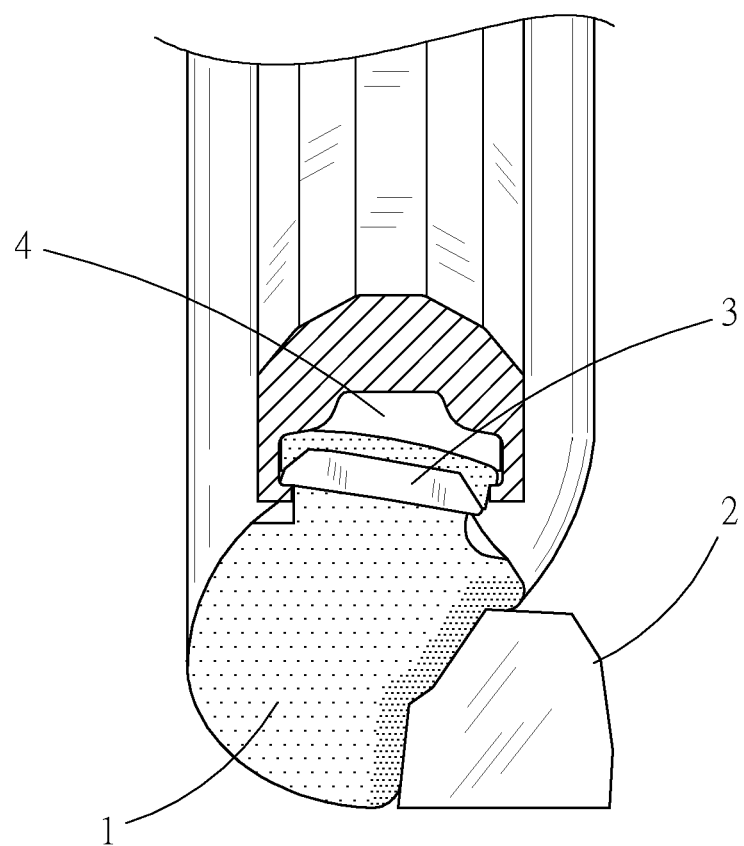
FIG. 1 is a view showing that a conventional airless air is detached from the rim when running over an obstacle.
Figure 2:
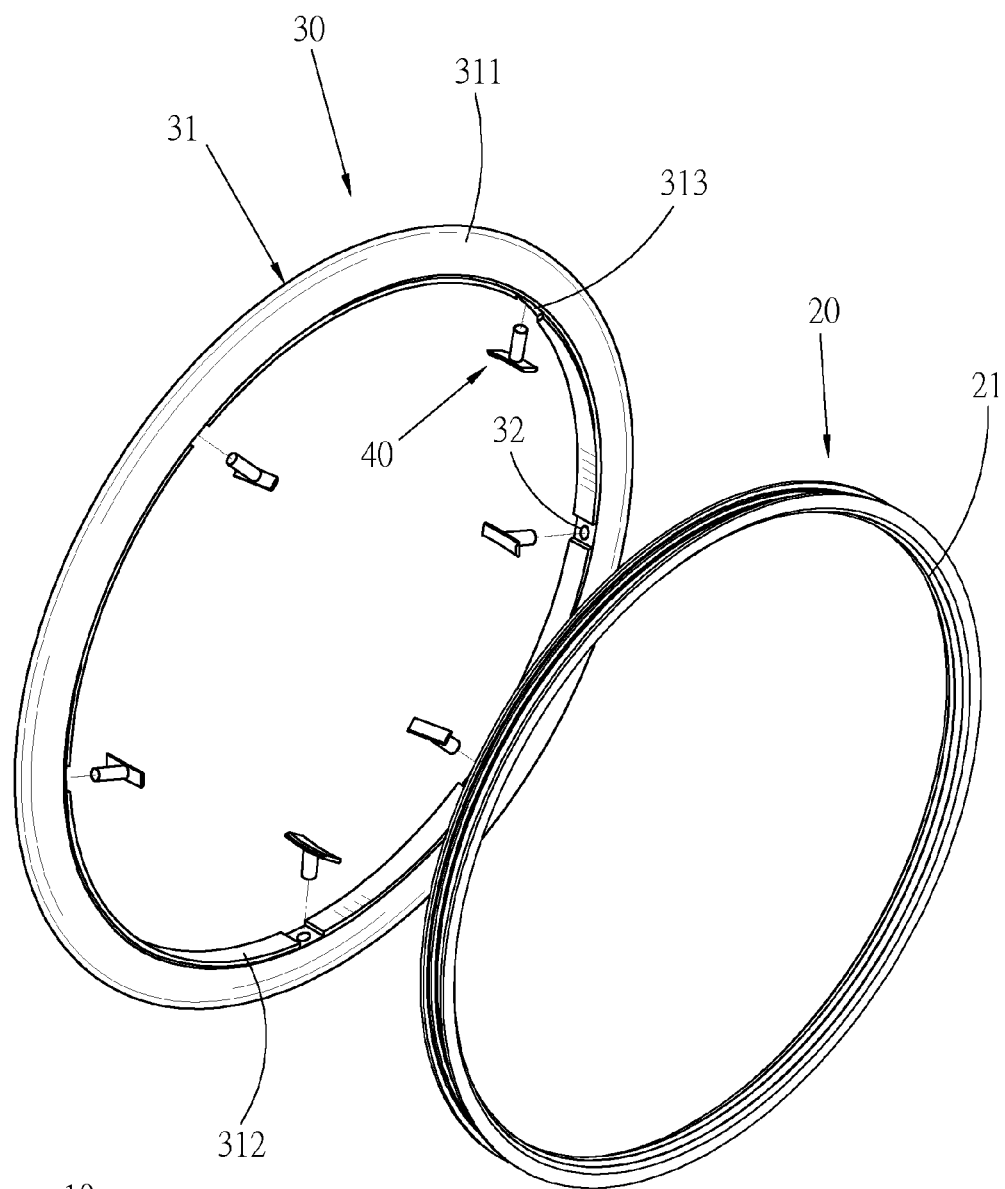
FIG. 2 is a perspective exploded view of a first embodiment of the present invention.
Figure 3:
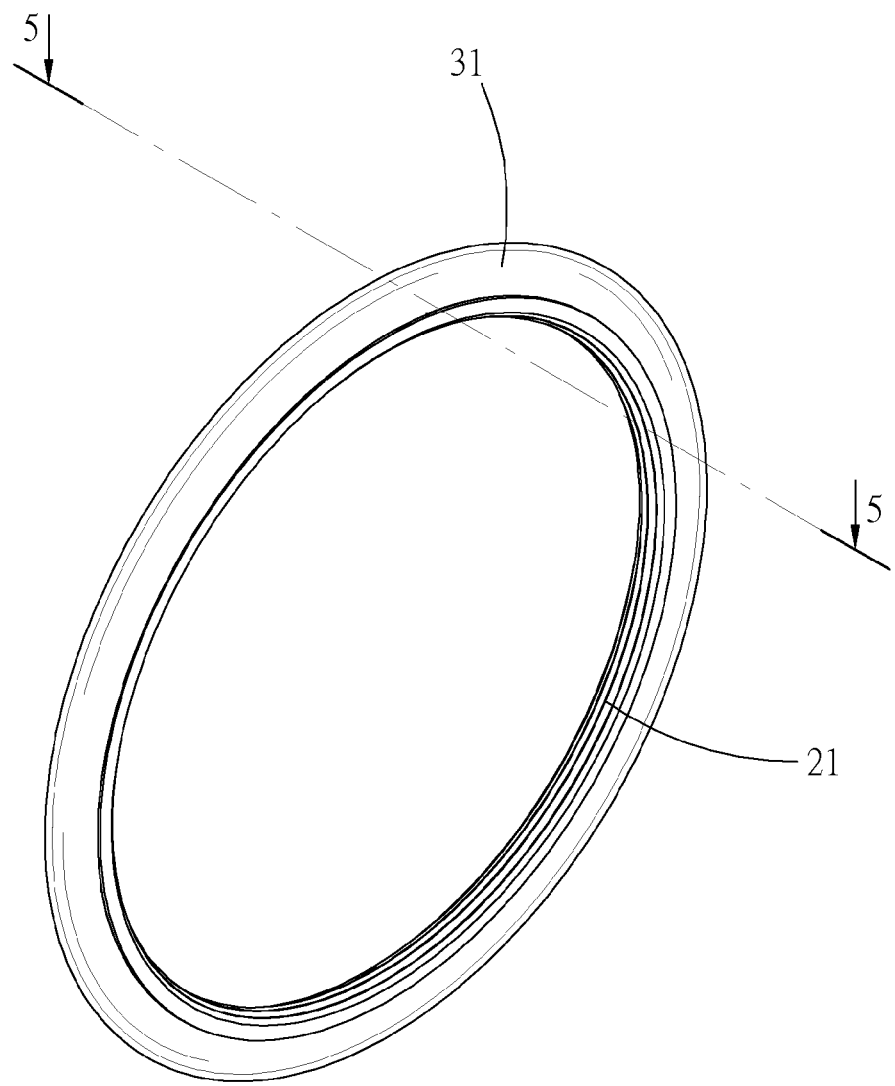
FIG. 3 is a perspective assembled view of the first embodiment of the present invention.
Figure 4:
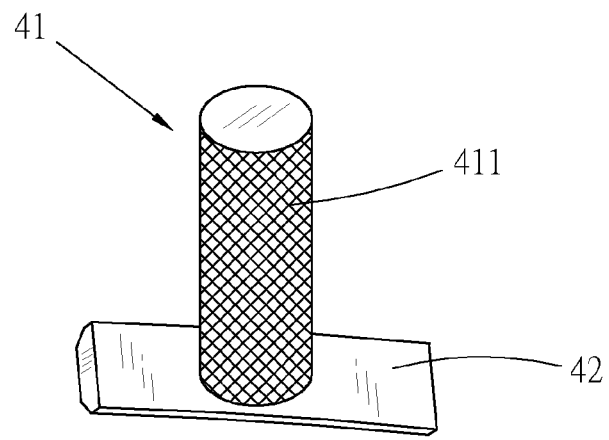
FIG. 4 is a perspective view of the fastening member of the first embodiment of the present invention.
Figure 5:
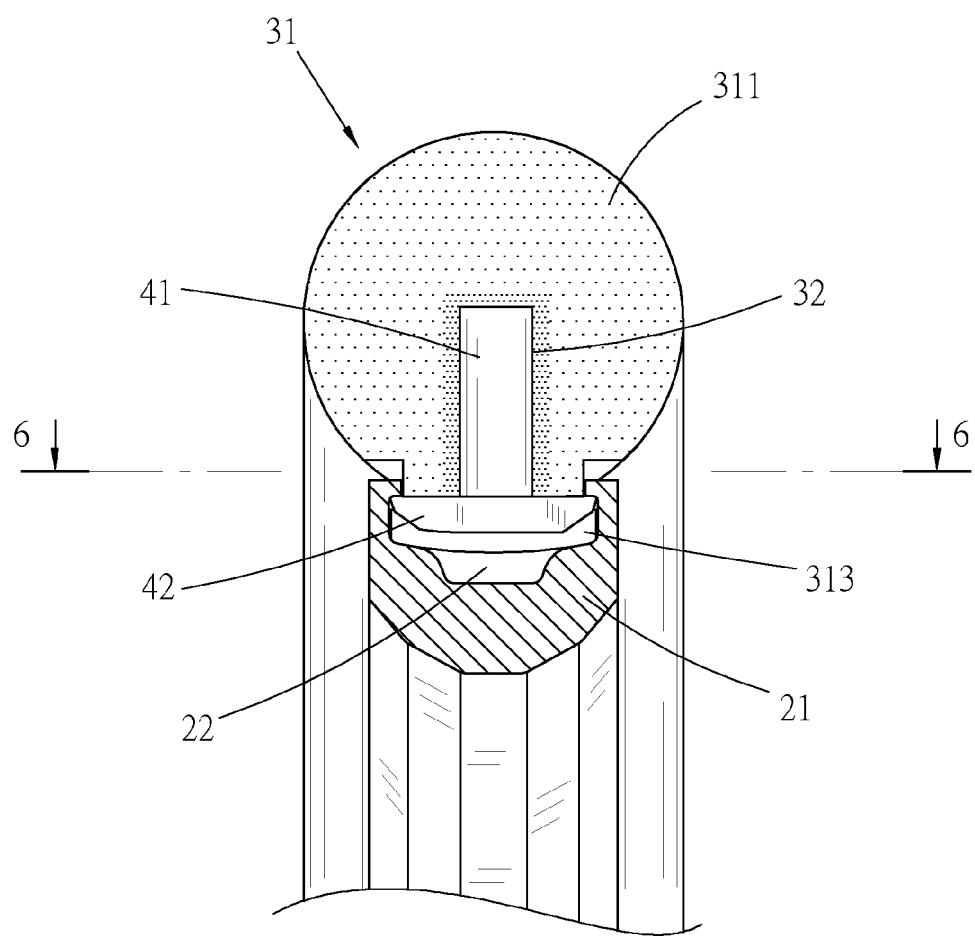
FIG. 5 is a sectional view taken along line 5-5 of FIG. 3.
Figure 6:
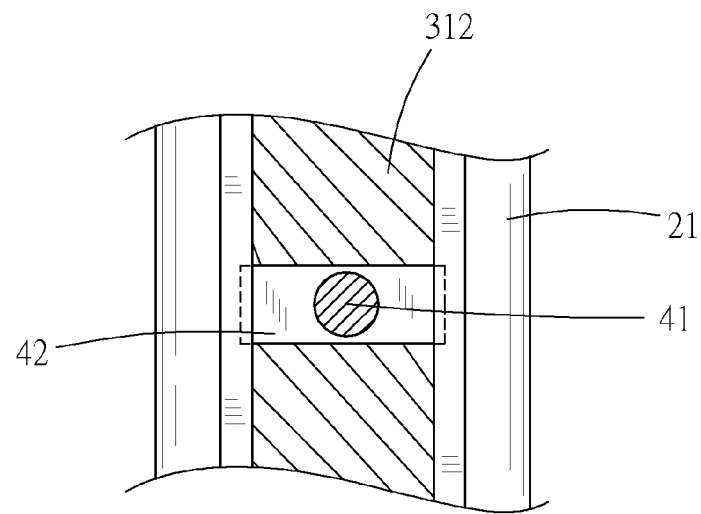
FIG. 6 is a sectional view taken along line 6-6 of FIG. 5.

Please refer to FIGS. 2 to 6. According to a first embodiment, the connection structure 10 between airless tire and rim of the present invention includes a rim 20, an airless tire 30 and multiple fastening members 40.

The rim 20 is similar to the conventional rim, substantially having an annular rim body 21. An annular connection groove 22 with smaller opening is formed on outer circumference of the rim body 21.

The airless tire 30 has a tire body 31 made of polymer material with suitable elasticity by molding. Multiple sockets 32 radially extend from inner circumference of the tire body 31 into the tire body 31 by suitable depth. Each socket 32 has an opening formed on the inner circumference of the tire body 31.

To speak more specifically, the tire body 31 has an annular main body 311. An annular tire lip 312 with a certain thickness protrudes from the inner circumference of the main body 311. The tire lip 312 is inserted in the connection groove 22, whereby the main body 311 is annularly disposed around the rim body 21. Multiple recesses 313 with suitable depth are formed on the inner circumference of the tire lip 312. The depth of the recesses 313 is approximately equal to the thickness of the tire lip 312. The recesses 313 are positioned where the sockets 32 are positioned. Accordingly, the tire lip 312 is interrupted by the recesses 313 to form a discontinuous annular form. The openings of the sockets 32 are formed on the inner circumference of the main body 311.

Each fastening member 40 has an extension section 41 with a certain length and a plate-shaped base section 42 perpendicularly fixedly connected with one end of the extension section 41. The extension section 41 is inserted in the corresponding socket 32 with one end protruding from the opening of the socket 41 on the inner circumference of the main body 311. The base section 42 is inlaid in the recess 313 and engaged in the connection groove 22. The opening of the connection groove 22 with smaller width restricts the base section 42 from detaching out of the connection groove 22 so that the base section 42 is located in the connection groove 22.

The extension section 41 is a column body 411 with a certain diameter. The extension section 41 is fixedly inserted in the socket 32 by press fit. One end of the column body 41 is perpendicularly fixedly connected with the base section 42, whereby the fastening member 40 can be securely connected with the tire body 31.

Figure 7:
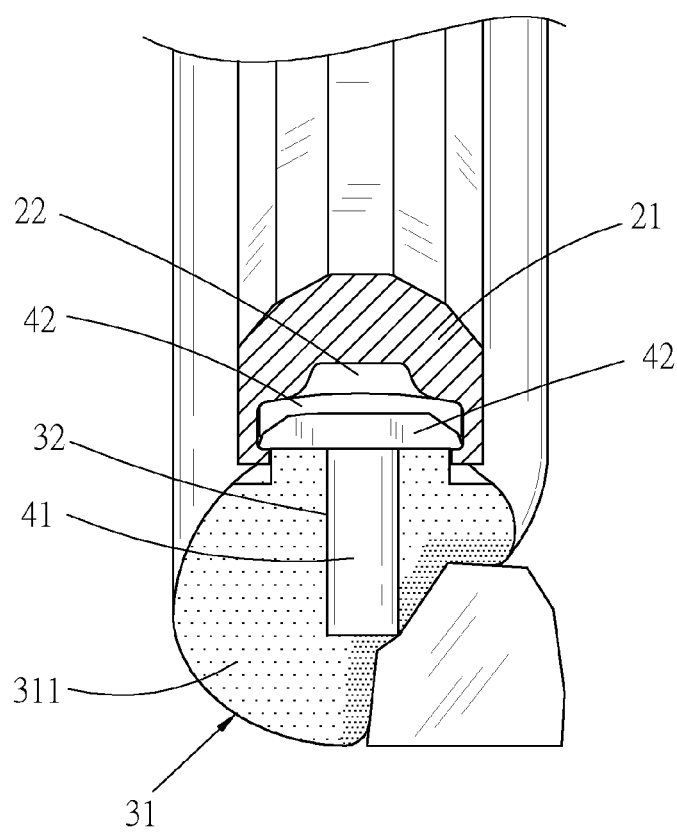
FIG. 7 is a sectional view showing that the first embodiment of the present invention runs over an obstacle and the airless tire is deformed.

According to the above arrangement, the base section 42 of the fastening member 40 is tightly engaged with the rim 20 and the extension section 41 is securely connected with the airless tire 30. Under such circumstance, the airless tire 30 is fastened to the rim 20 without easy detachment. Moreover, the extension section 41 is correspondingly inserted in the radially extending socket 32. Accordingly, the fastening member 40 provides two-dimensional connection force between the airless tire 30 and the rim 20. To speak more specifically, when the airless tire 30 contacts the ground to smoothly rotate, the force applied to the tire face will be uniformly distributed to every part of the airless tire 30. In this case, the airless tire 30 is uniformly deformed to absorb the force. When the airless tire 30 runs over an obstacle as shown in FIG. 7, the action force concentrated on one side of the tire body 31 will cause severe deformation of one side of the tire body 31. At this time, since the extension section 41 is fixedly connected with the base section 42, the force applied to one side of the tire body 31 is partially transmitted from the base section 42 to the rim 20. Accordingly, the airless tire 30 is prevented from being over-deformed due to excessively great action force applied to a part of the airless tire 30. Therefore, the airless tire 30 is prevented from detaching from the rim 20 and can be stably connected with the rim 20.

Furthermore, in order to make the fastening members 40 provide better support for the airless tire 30, the length of the extension section 41 can be at least one half of the thickness of the tire body 31. In this case, the extension section 41 can extend into the tire body 31 by a depth over the center of the tire body 31. This can achieve better support effect.

Figure 8:
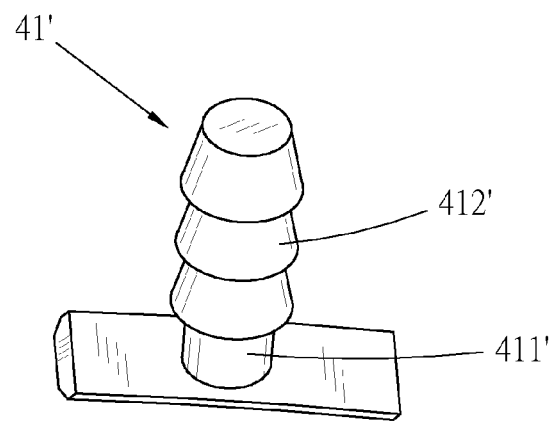
FIG. 8 is a perspective view of the fastening member of a second embodiment of the present invention.
Figure 9:
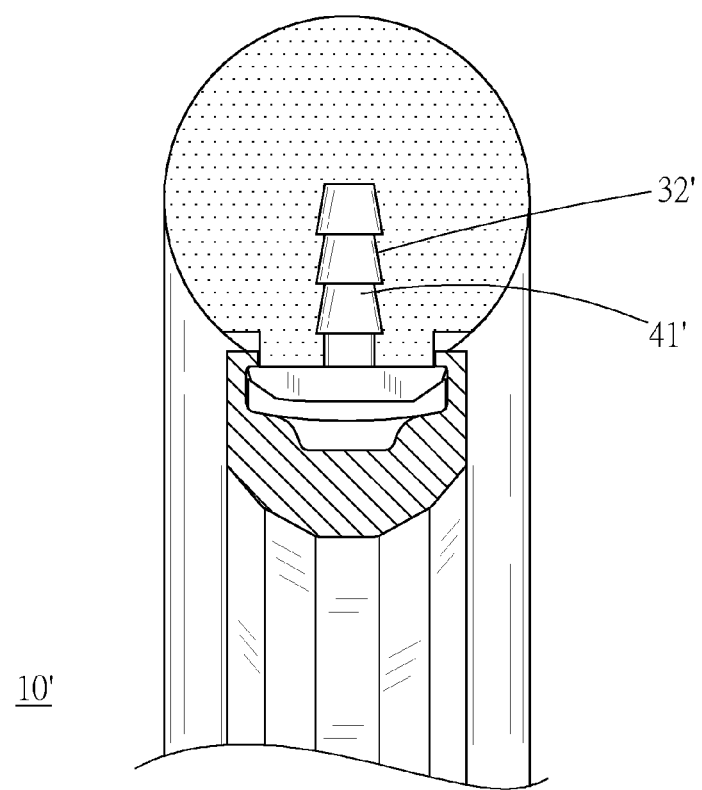
FIG. 9 is a sectional view of the second embodiment of the present invention.

Please now refer to FIGS. 8 and 9, which show a second embodiment of the connection structure 10' between airless tire and rim of the present invention. The second embodiment is substantially identical to the first embodiment. The second embodiment is different from the first embodiment in that the connection force between the extension section 41' and the socket 32' is enhanced. In the second embodiment, the extension section 41' has a column body 411' and further has at least one annular protrusion 412' outward radially protruding from the column body 411'. The protrusion 412' is inserted into the socket 32' to abut against the wall of the socket 32' so as to enhance the connection force therebetween.

Moreover, there are multiple protrusions in the form of a reverse hook. This can further enhance the connection force between the extension section 41' and the socket 32'.

Figure 10:
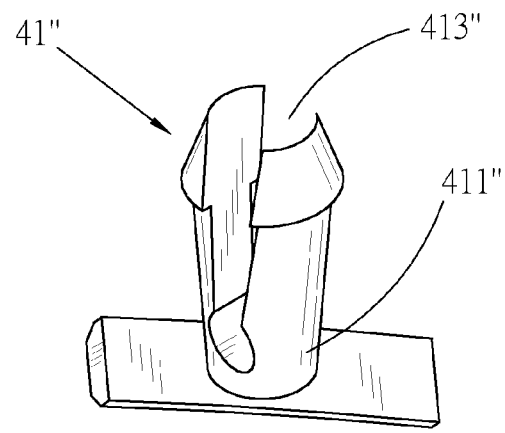
FIG. 10 is a perspective view of the fastening member of a third embodiment of the present invention.
Figure 11:
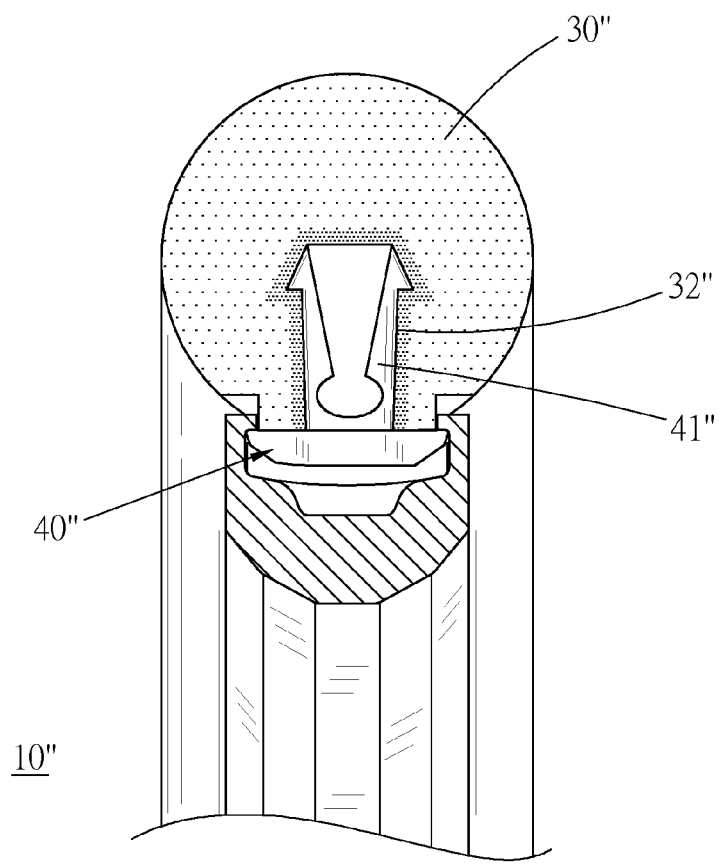
FIG. 11 is a sectional view of the third embodiment of the present invention.

Please now refer to FIGS. 10 and 11, which show a third embodiment of the connection structure 10" between airless tire and rim of the present invention. The third embodiment is substantially identical to the second embodiment in object and effect. However, the third embodiment is different from the second embodiment in means. In the third embodiment, each extension section 41" further has a split 413" inward extending from the other end of the column body 411" by a certain depth to divide the column body 411". Accordingly, under an external force, the column body 411" will be temporarily contracted to reduce the outer diameter. In this case, the column body 411" can be successfully inserted into the corresponding socket 32" with smaller inner diameter. After the external force disappears, the column body 411" can restore to its original state with larger outer diameter and expand within the socket 32". Accordingly, the column body 411" can apply a force to the wall of the socket 32" to enhance the connection force therebetween. Therefore, the fastening member 40" can be more securely connected with the airless tire 30".

The above embodiments are only used to illustrate the present invention, not intended to limit the scope thereof. Many modifications of the above embodiments can be made without departing from the spirit of the present invention.

What is claimed is:

1. A fastening member for use with an airless tire having multiple recesses extending across an inner circumference and multiple sockets, one socket of the multiple sockets corresponding with one recess of the multiple recesses, the fastening member comprising:
    a base section having a first end and a second end spaced from the first end by a predetermined distance; and
    an extension section positioned between the first and second ends and outward extending from the base section by a predetermined length;
    wherein the extension section has a column body and at least one protrusion, the column body is directly connected to and outwardly extending from the base section, the at least one protrusion outwardly and radially protruding from the column body;

wherein the base section is located in a corresponding recess of the multiple recesses of the airless tire and the column body and the at least one protrusion are inserted into a corresponding socket of the multiple sockets of the airless tire, and the at least one protrusion engaging a wall of the socket;

wherein the extension section has a length equal to or greater than a one-half a thickness of a tire body of the airless tire;

wherein the multiple sockets and the extension section extend through an annular tire lip of the airless tire and into a main section of the airless tire a predetermined distance being at least to a center of the tire body of the airless tire.

2. The fastening member as claimed in claim 1, wherein the protrusion is an annular protrusion disposed on the circumference of the column body.

3. A connection structure between airless tire and rim, comprising:

a rim having an annular rim body and an annular connection groove formed on outer circumference of the rim body;

an airless tire having an annular tire body coaxially fitted on the rim body, multiple sockets radially extending from inner circumference of the tire body into the tire body; and multiple fastening members, each of the fastening members having an extension section with a predetermined length, the extension section being coaxially inserted in the corresponding socket with one end protruding from an opening of the socket on the inner circumference of the tire body, the fastening member further having a base section fixedly connected with one end of the extension section, the base section being engaged in the connection groove;

wherein the extension section has a column body and at least one protrusion, the column body outwardly extending from the base section, the at least one protrusion outwardly and radially protruding from the column body and engaging a wall of the socket;

wherein the tire body has an annular main body, an annular tire lip protruding from the inner circumference of the main body, the tire lip being inserted in the connection groove, multiple recesses being formed across the tire lip, each recess of the multiple recesses corresponding with one socket of the multiple sockets, the base section of each said fastening member being inlaid in a corresponding recess of the tire body and the at least one protrusion and column body being inserted into the corresponding socket of the tire body;

wherein the extension section has a length equal to or greater than a one-half a thickness of the tire body of the airless tire;

wherein the multiple sockets and the extension section of the multiple fastening members extend through the annular tire lip of the airless tire and into a main section of the airless tire a predetermined distance being at least to a center of the tire body of the airless tire.

4. The connection structure between airless tire and rim as claimed in claim 3, wherein the column body is tightly inserted in the socket by press fit.

* * * * *